US006362587B1

(12) United States Patent
Hutter

(10) Patent No.: US 6,362,587 B1
(45) Date of Patent: Mar. 26, 2002

(54) WINDSHIELD WIPER SYSTEM FOR A MOTOR VEHICLE AND RELATED METHOD

(75) Inventor: Robert B Hutter, South Lyon, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/587,042

(22) Filed: Jun. 2, 2000

(51) Int. Cl.$^7$ .................................................. B60S 1/08

(52) U.S. Cl. ...................... 318/444; 318/446; 318/483; 318/DIG. 2

(58) Field of Search ................................ 318/444, 446, 318/470, 483, DIG. 2

(56) References Cited

U.S. PATENT DOCUMENTS 3,670,174 A * 6/1972 Sakakibara ............... 307/10 R
4,219,706 A * 8/1980 Koch et al. .................... 200/4
5,450,525 A * 9/1995 Russell et al. ............. 395/2.84
5,654,617 A * 8/1997 Mills .......................... 318/444
5,699,857 A 12/1997 Flaishans et al. ........... 165/202
5,811,950 A 9/1998 Lawson ...................... 318/484

* cited by examiner

*Primary Examiner*—Robert E. Nappi
*Assistant Examiner*—Rita Leykin
(74) *Attorney, Agent, or Firm*—Lisa K. Mack

(57) ABSTRACT

In one form, the present invention provides an apparatus for controlling a windshield wiper system of a motor vehicle in combination with the motor vehicle. The motor vehicle has a steering wheel. The apparatus includes a first actuation device coupled to the windshield wiper system. The first actuation device controls continuous operation of the windshield wiper system at a selected speed. The second actuation device is coupled to the windshield wiper system and is operative to temporarily increase the selected speed selected by the first actuation device. The second actuation device includes a button for attachment to the steering wheel.

11 Claims, 3 Drawing Sheets

14
12
12
34
32
10
36
40
30
38
38
24

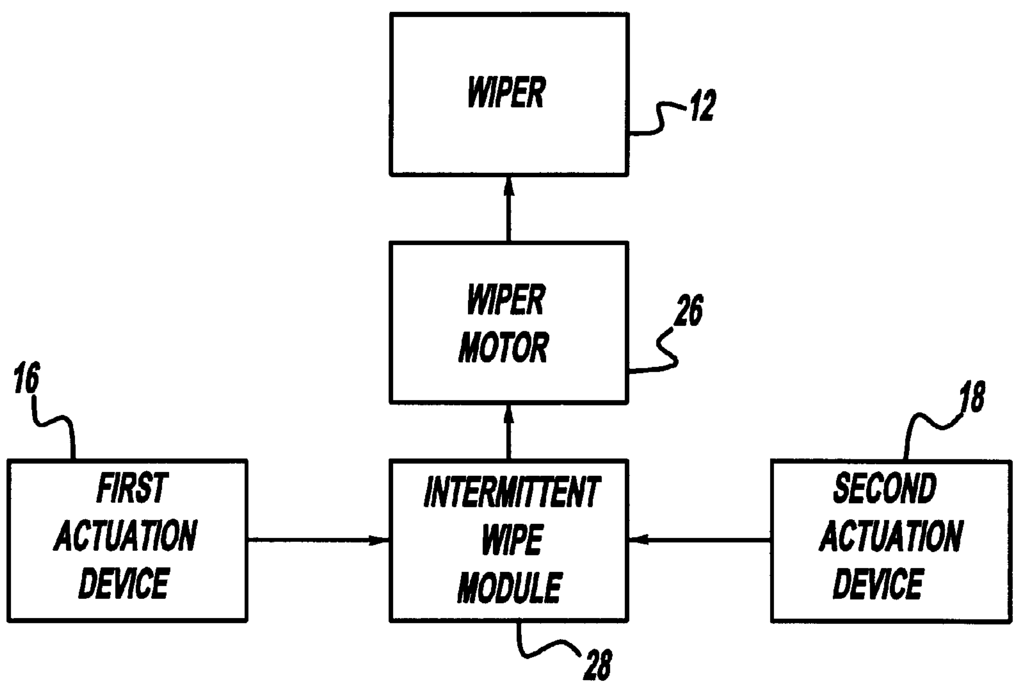
Figure - 2
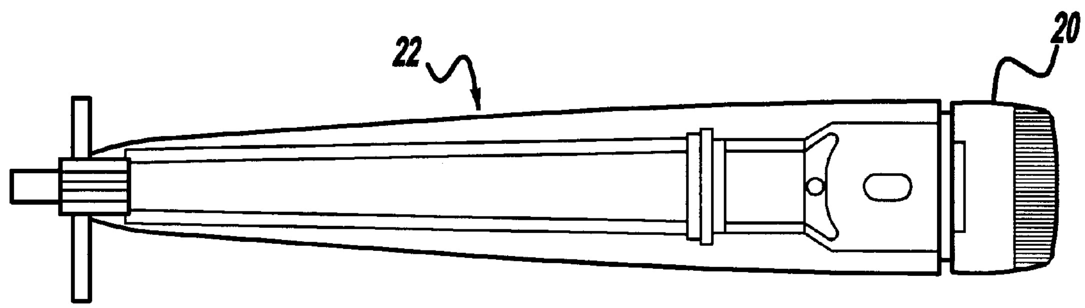
Figure - 3A
Figure - 3B

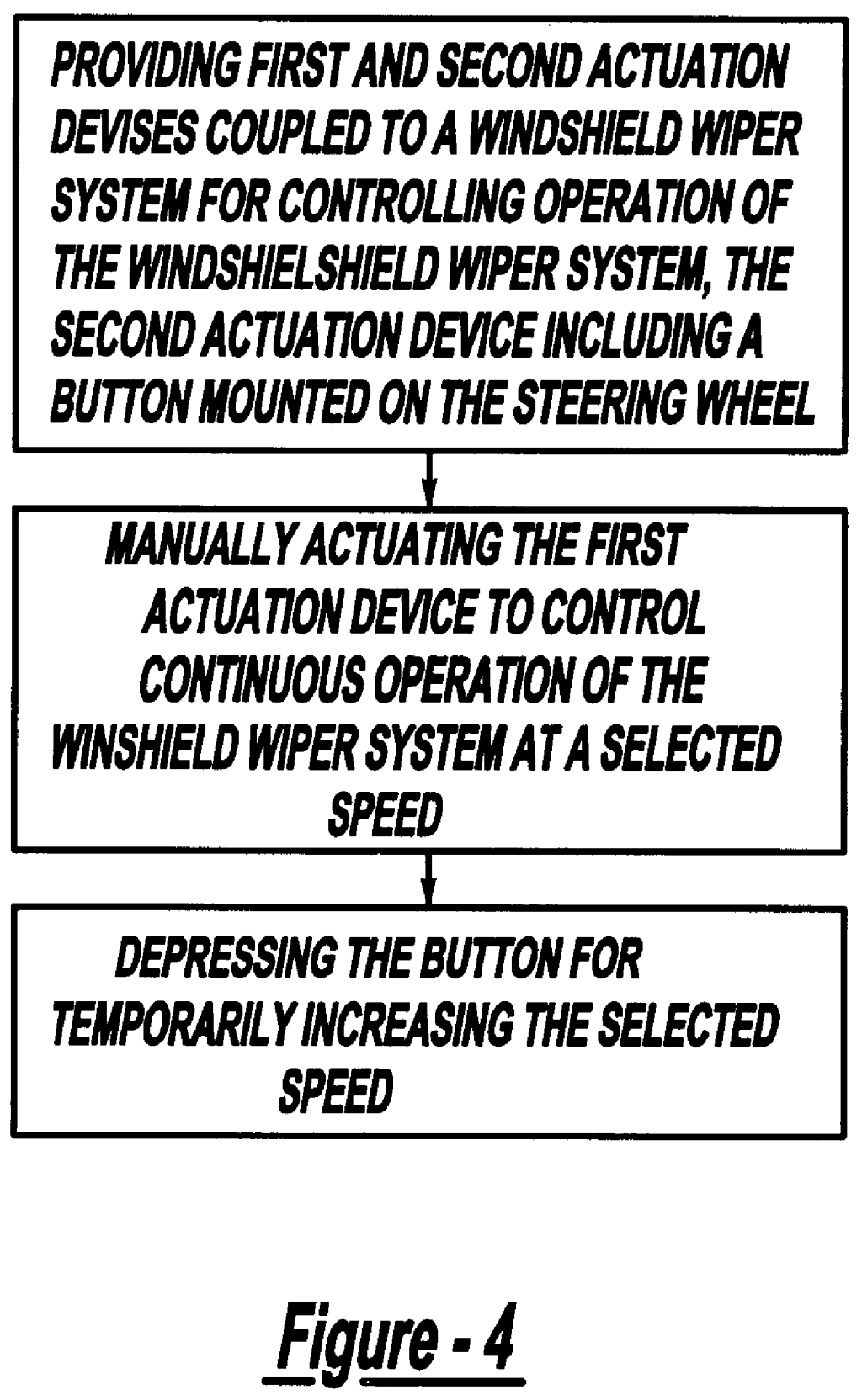

PROVIDING FIRST AND SECOND ACTUATION DEVISES COUPLED TO A WINDSHIELD WIPER SYSTEM FOR CONTROLLING OPERATION OF THE WINDSHIELSHIELD WIPER SYSTEM, THE SECOND ACTUATION DEVICE INCLUDING A BUTTON MOUNTED ON THE STEERING WHEEL

↓

MANUALLY ACTUATING THE FIRST ACTUATION DEVICE TO CONTROL CONTINUOUS OPERATION OF THE WINSHIELD WIPER SYSTEM AT A SELECTED SPEED

↓

DEPRESSING THE BUTTON FOR TEMPORARILY INCREASING THE SELECTED SPEED

Figure - 4

WINDSHIELD WIPER SYSTEM FOR A MOTOR VEHICLE AND RELATED METHOD

BACKGROUND OF THE INVENTION

1. Field of the Invention

The present invention generally relates to motor vehicles. More particularly, the present invention relates to a windshield wiper system for a motor vehicle and a related method.

2. Discussion

Various windshield wiper systems for motor vehicles are known in the pertinent art. For example, commonly assigned U.S. Pat. No. 5,811,950 discloses an intermittent windshield wiper system. The system disclosed by U.S. Pat. No. 5,811,950 provides a high speed mode of wiper operation, a low speed mode of wiper operation and an intermittent mode of wiper operation. The system also provides for a wash mode of wiper operation. U.S. Pat. No. 5,811,950 is incorporated by reference as if fully set forth herein.

A need remains in the pertinent art for a windshield wiper system of a motor vehicle which additionally incorporates a second actuation device for temporarily increasing wiper speed to quickly remove snow, water or mud from the windshield that is readily accessible on a steering wheel.

SUMMARY OF THE INVENTION

It is a general object of the present invention to provide a quick response actuation device which is readily accessible to the driver of the vehicle for temporarily providing an increase in wiper speed.

In one form, the present invention provides an apparatus for controlling a windshield wiper system of a motor vehicle in combination with the motor vehicle. The motor vehicle has a steering wheel. The apparatus includes a first actuation device coupled to the windshield wiper system. The first actuation device controls continuous operation of the windshield wiper system at a selected speed. The second actuation device is coupled to the windshield wiper system and is operative to temporarily increase the selected speed selected by the first actuation device. The second actuation device includes a button for attachment to the steering wheel.

In another form, the present invention provides a method of controlling a windshield wiper system for a motor vehicle. The motor vehicle includes a steering wheel. The method includes a first general step of providing first and second actuation devices coupled to the windshield wiper system for controlling operation of the windshield wiper system. The second actuation device includes a button mounted on the steering wheel. The method includes the second general step of manually actuating the first actuation device to control continuous operation of the windshield wiper system at a selected speed. The method of the present invention further includes a third general step of depressing the button for temporarily increasing the selected speed.

BRIEF DESCRIPTION OF THE DRAWINGS

The present invention will become more fully understood from the detailed description and the accompanying drawings, wherein:

FIG. 2 is a schematic diagram of the apparatus of the present invention.

FIGS. 3*a* and 3*b* are enlarged views of the steering column mounted stalk of the windshield wiper system of the present invention.

FIG. 4 is a view illustrating the general steps of a preferred method of the present invention.

DETAILED DESCRIPTION OF THE PREFERRED EMBODIMENT

Figure 1:
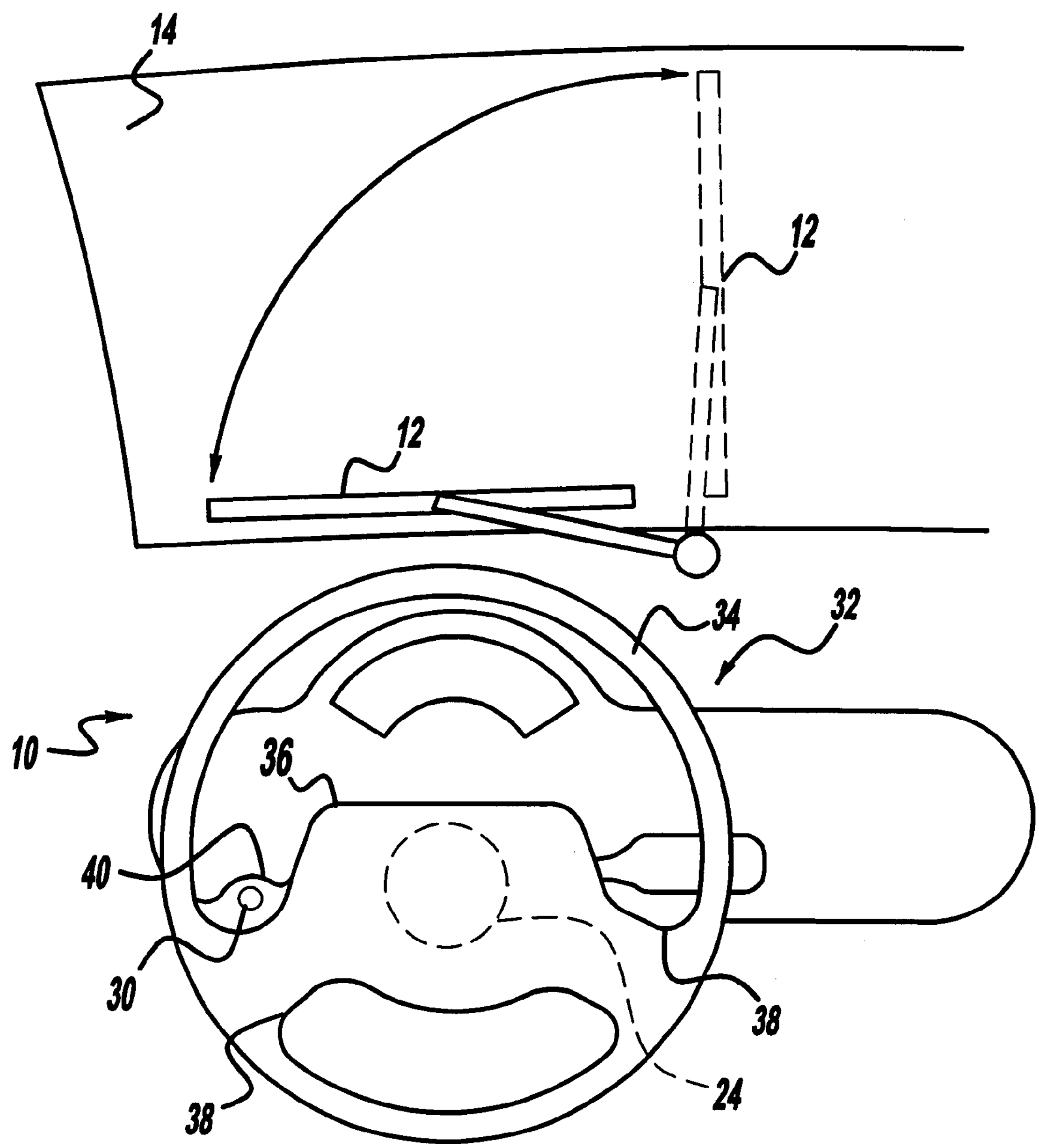
FIG. 1 is a simplified view of a portion of an interior of a motor vehicle incorporating a windshield wiper system constructed in accordance with the teachings of a preferred embodiment of the present invention.

With initial reference to the environmental view of FIG. 1, a windshield wiper system for a motor vehicle constructed in accordance with the teachings of a preferred embodiment of the present invention is illustrated and generally identified at reference numeral 10. The windshield wiper system 10 is shown operatively incorporated into a portion of an exemplary motor vehicle and is operative for controlling one or more wiper blades for cleaning a windshield 14 of the motor vehicle. It will be understood by those skilled in the art that the teachings of the present invention are not limited to any particular type of motor vehicle.

With continued reference to FIG. 1 and additional reference to FIGS. 2, 3*a* and 3*b*, the windshield wiper system 10 of the present invention is illustrated to generally include a first actuation device and a second actuation device 18 for controlling the operation of the at least one wiper 12. The first actuation device 16 is conventional in both construction and operation and is operative for controlling continuous operation of the wiper 12 at a selected speed. In the exemplary embodiment illustrated, the first actuation device includes a control knob 20 mounted at the end of a stalk 22 which extends from a steering column 24. The first actuation device 16 conventionally permits the driver to select from a low wiper speed, a high wiper speed, or an intermittent wiper delay mode. The knob 20 at the end of the stalk 22 is rotated to a desired wiper speed, or the intermittent wipe delay mode and integral.

The speed of the at least one wiper 12 is controlled through the first actuation device 16 by a wiper motor 26. The wiper motor 26 is controlled through an intermittent wiper module 28. One suitable intermittent wipe module is commercially available on various vehicles manufactured by the assignee of the subject application.

In a conventional manner, the low and high wiper speeds is controlled by a flow of current to sets of brushes. Conventional electronic circuitry within the intermittent wipe module 28 is used to accomplish the wiper delay mode. The delay time selected by the driver has a range from approximately ½ second to about 14 seconds. The driver selects the length of delay by placing the control knob 20 in one of a plurality of intermittent wipe detent positions. In one application, there are five different intermittent wipe detent positions. One of the detent positions sends a battery voltage signal to the intermittent wipe module 28, while the other four positions use resistors to provide progressively lower voltage signals to the module 28.

The second actuation device 18 is operative for temporarily increasing the speed selected by the first actuation device 16. The second actuation device 18 is preferably shown to include a manual operated member or button 30 carried by a steering wheel 32 of the motor vehicle. By depressing the button 30, a battery voltage signal is sent to the intermittent wipe module 28 for operating the wiper motor 26 at the high speed. When the button 30 is released, the speed of the at least one wiper 12 immediately returns to the speed selected by the first actuation device 16.

In the embodiment illustrated, the steering wheel 32 of the motor vehicle includes an outer ring 34 and a central hub portion 36 which are connected by a pair of arms 38. The arms 38 are oriented at four o'clock and eight o'clock. The button 30 is illustrated extending from a mounting portion 40 which extends from one of the radially extending arms 38. In this position, the button 30 is located in close proximity to an operator's thumb (not shown) in a conventional steering wheel grip. As such, the button 30 can be controlled by the vehicle operator without the requirement for the vehicle operator to remove either of his or her hands from the steering wheel 32. In this manner, snow, mud or other visibility obscuring substances located on the windshield 14 can be quickly and easily removed.

With continued reference to FIGS. 1–3*b,* and additional reference to FIG. 4, a preferred method of the present invention will be described. The method of the present invention includes a first general step 110 of providing first and second actuation devices 16 and 18 for controlling operation of a windshield wiper system 10, the second actuation device includes a button 30 mounted on a steering wheel 32.

In a second general step 120, the first actuation device 16 is manually actuated to control continuous operation of the windshield wiper system 10 at a selected speed.

In a third general step 130, the button 30 is depressed for temporarily increasing the selected speed.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An apparatus for controlling a windshield wiper system of a motor vehicle in combination with the motor vehicle, the motor vehicle having a steering wheel, the apparatus comprising:

a first actuation device coupled to the windshield wiper system and for controlling continuous operation of the windshield wiper system at a selected speed; and a second actuation device coupled to the windshield wiper system for temporarily increasing the selected speed selected by the first actuation device, wherein the second actuation device includes a manually operated member attached to the steering wheel for instantly increasing the selected speed until released by the operator.

2. The apparatus for controlling a windshield wiper system of a motor vehicle of claim 1, wherein the manually operated member is a button.

3. The apparatus for controlling a windshield wiper system of a motor vehicle of claim 1, wherein the first actuation device is carried by a stalk mounted to a steering column.

4. The apparatus for controlling a windshield wiper system of a motor vehicle of claim 1, wherein the manually operated member is disposed on a front face of the steering wheel.

5. The apparatus for controlling a windshield wiper system of a motor vehicle of claim 1, wherein the steering wheel includes a central hub portion and an outer rim connected by a pair of arms, the manually operated member carried by one of the arms.

6. A motor vehicle comprising:

at least one wiper blade;

a wiper motor for driving the wiper at a selected speed;

a first actuation device for controlling continuous operation of the wiper motor at the selected speed; and a second actuation device for temporarily increasing the selected speed selected by the first actuation device, wherein the second actuation device includes a manually operated member attached to the steering wheel for instantly increasing the selected speed until released by the operator.

7. The motor vehicle of claim 6, wherein the manually operated member is a button.

8. The motor vehicle of claim 6, wherein the first actuation device is carried by a stalk mounted to a steering column.

9. The motor vehicle of claim 6, wherein the manually operated member is disposed on a front face of the steering wheel.

10. The motor vehicle of claim 6, wherein the steering wheel includes a central hub portion and an outer rim connected by a pair of arms, the manually operated member carried by one of the arms.

11. A method of controlling a windshield wiper system for a motor vehicle, the motor vehicle including a steering wheel, the method comprising the steps of:

providing first and second actuation devices coupled to the windshield wiper system for controlling operation of the windshield wiper system, the second actuation device including a button mounted on the steering wheel;

manually actuating the first actuation device to control continuous operation of the windshield wiper system at a selected speed; and depressing the button for instantly and temporarily increasing the selected speed; and releasing the button for returning to the speed selected by the first actuation device.

* * * * *